(12) United States Patent
Ripperda et al.

(10) Patent No.: US 11,768,572 B2
(45) Date of Patent: Sep. 26, 2023

(54) VIRTUAL SERVICE DIAGNOSIS AND CONTROL SYSTEM FOR A BEVERAGE DEVICE

(71) Applicant: BUNN-O-MATIC CORPORATION, Springfield, IL (US)

(72) Inventors: Keith M. Ripperda, Springfield, IL (US); Brent W. Kerske, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 203 days.

(21) Appl. No.: 16/086,034

(22) PCT Filed: Mar. 17, 2017

(86) PCT No.: PCT/US2017/022945
§ 371 (c)(1),
(2) Date: Sep. 18, 2018

(87) PCT Pub. No.: WO2017/161254
PCT Pub. Date: Sep. 21, 2017

(65) Prior Publication Data
US 2020/0288905 A1    Sep. 17, 2020

Related U.S. Application Data

(60) Provisional application No. 62/310,512, filed on Mar. 18, 2016.

(51) Int. Cl.
*A47J 31/52*    (2006.01)
*G06F 3/0488*    (2022.01)
(Continued)

(52) U.S. Cl.
CPC .............. *G06F 3/048* (2013.01); *A47J 31/52* (2013.01); *A47J 31/521* (2018.08);
(Continued)

(58) Field of Classification Search
CPC .............. G06F 2111/18; G06F 3/0481; G06F 3/04817; G06F 9/4443; G06F 3/04847;
(Continued)

(56) References Cited

U.S. PATENT DOCUMENTS 9,053,363 B1 *    6/2015    Nordstrom ......... G06K 9/00536
2003/0218638 A1 *    11/2003    Goose ................... G01C 21/20
715/850

(Continued)

FOREIGN PATENT DOCUMENTS

CN    101689313    3/2010
CN    102132241    7/2011
(Continued)

OTHER PUBLICATIONS

Search and Written Opinion issued in Int'l App. No. PCT/US2017/022945 (2017).
(Continued)

*Primary Examiner* — Todd Buttram
(74) *Attorney, Agent, or Firm* — Barnes & Thornburg LLP

(57) ABSTRACT

A beverage device with improved diagnostic and repair functionality is shown and described. The beverage device includes an on-board touch screen display and a virtual rendering of device components of the beverage device. Repair instructions, replacement instructions, and diagnostic instructions may be more easily, and efficiently understood and followed by following on-screen outputs, alerts, and instructions that may include various color outputs, animations, and rotatable, movable, or zoomable views.

20 Claims, 6 Drawing Sheets

(51) Int. Cl.
    *G06F 3/16*     (2006.01)
    *G06T 19/20*     (2011.01)
    *G06Q 10/00*     (2023.01)
    *G06F 3/048*     (2013.01)
    *G06Q 10/20*     (2023.01)

(52) U.S. Cl.
    CPC ............ *G06F 3/0488* (2013.01); *G06F 3/167* (2013.01); *G06Q 10/20* (2013.01); *G06T 19/20* (2013.01); *G06F 2203/04806* (2013.01)

(58) Field of Classification Search
    CPC .... G06F 11/3664; G06F 3/012; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
    See application file for complete search history.

(56) References Cited

U.S. PATENT DOCUMENTS

| | | | | |
|---|---|---|---|---|
| 2005/0269397 A1* | 12/2005 | Shepley | ................ | G07F 19/203 235/379 |
| 2012/0100275 A1* | 4/2012 | Bishop | ................... | A47J 31/32 426/474 |
| 2013/0332312 A1* | 6/2013 | Segal | ................. | G06Q 30/0643 705/26.8 |
| 2013/0275313 A1* | 10/2013 | Vahid | .................... | G06Q 10/20 705/305 |
| 2014/0188271 A1* | 7/2014 | Hernandez | .......... | G06F 3/04817 700/232 |
| 2015/0057961 A1* | 2/2015 | Montoya | ............ | G06F 11/2294 702/121 |

FOREIGN PATENT DOCUMENTS

| | | |
|---|---|---|
| CN | 104885072 | 9/2015 |
| WO | WO 2009/005773 | 1/2009 |
| WO | WO 2010/022495 | 3/2010 |
| WO | WO 2014/105511 | 7/2014 |

OTHER PUBLICATIONS

Office Action issued in Chinese Appl. No. 201780017375.0 (dated Oct. 30, 2020).

* cited by examiner

SERVICE(CONT.)

DISPENSE PLATFORM REMOVAL

1. REMOVE CONCENTRATE DISPENSE TIPS BY TURNING 1/4 TURN TO THE LEFT, THEN PULL STRAIGHT DOWN.
2. LIFT AND REMOVE PRODUCT SHELF TO ACCESS DISPENSE PLATFORM(S).
3. REMOVE FRONT THUMB SCREW HOLDING DISPENSE PLATFORM(S).
4. DISCONNECT 12 PIN CONNECTOR ABOVE DISPENSE PLATFORM IN REAR.
5. DISCONNECT 3/8" WATER LINE AT QUICK DISCONNECT.
6. REMOVE DISPENSE PLATFORM(S) BY PULLING FORWARD.

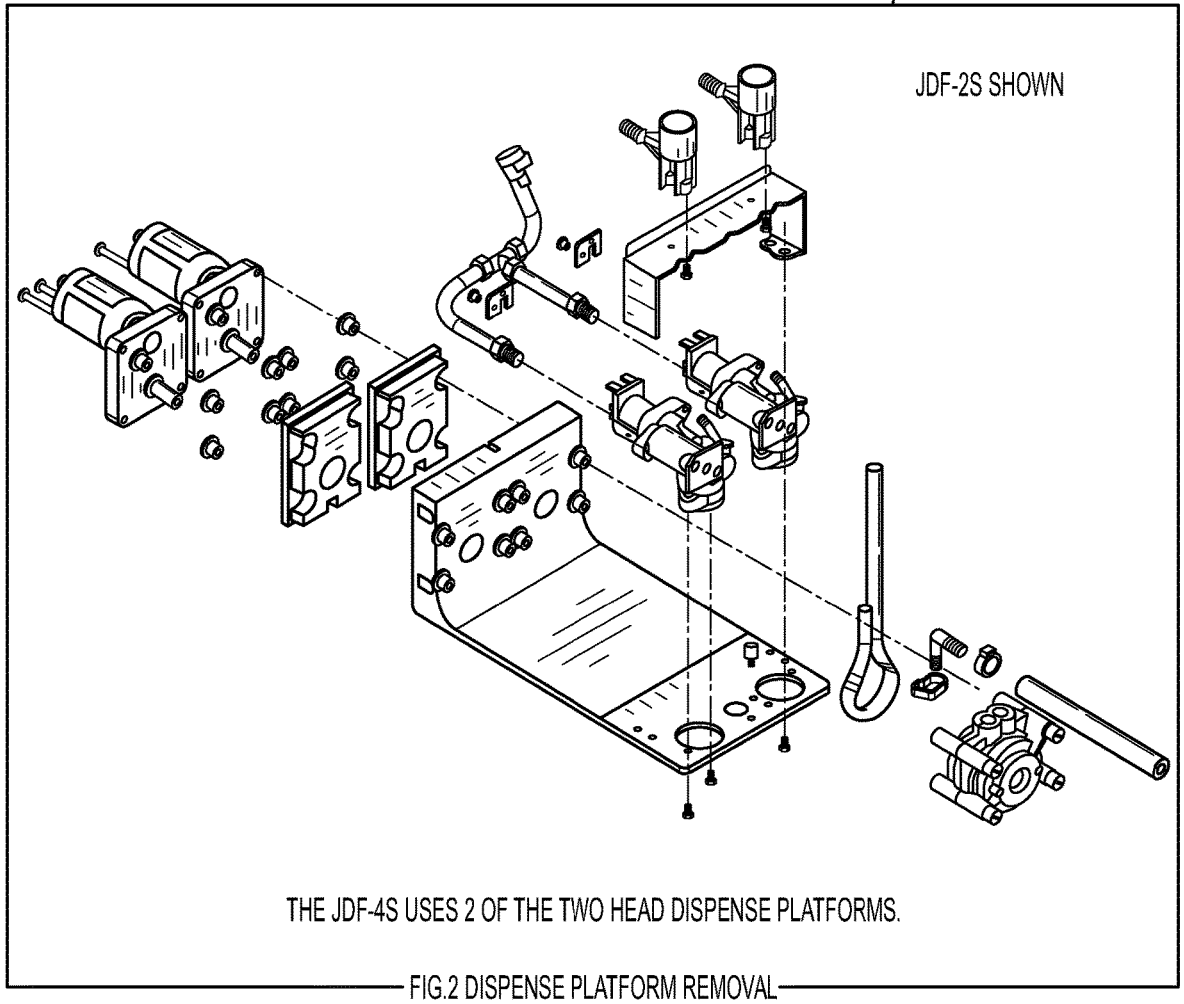

JDF-2S SHOWN

THE JDF-4S USES 2 OF THE TWO HEAD DISPENSE PLATFORMS.

FIG.2 DISPENSE PLATFORM REMOVAL

*FIG. 4*

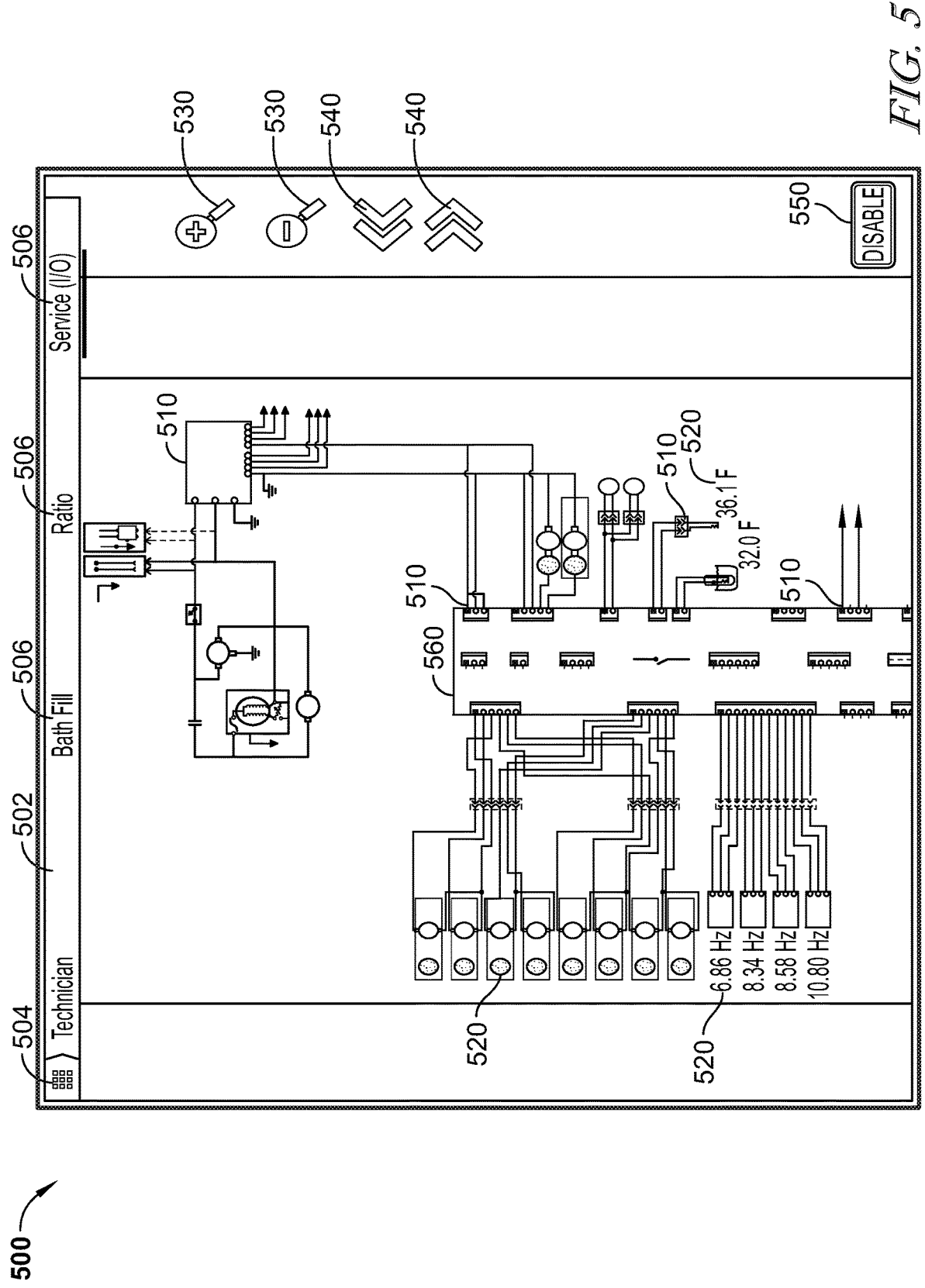

VIRTUAL SERVICE DIAGNOSIS AND CONTROL SYSTEM FOR A BEVERAGE DEVICE

CROSS REFERENCE TO RELATED APPLICATIONS

This application is a U.S. nationalization under 35 U.S.C. § 371 of International Application No. PCT/US2017/022945, filed Mar. 17, 2017, which claims the benefit of priority under 35 U.S.C. § 119(e) to U.S. Provisional Patent Application No. 62/310,512, filed Mar. 18, 2016. The disclosures set forth in the referenced applications are incorporated herein by reference in their entireties.

BACKGROUND

The present disclosure relates generally to beverage preparation devices. More specifically, the present disclosure relates to beverage preparation and dispensing devices including virtual service diagnosis and control systems.

A variety of beverage preparation devices have been developed. For example, beverage preparation devices have been developed to prepare and dispense hot, cold, frozen, and frothed versions of beverages such as coffee, espresso, tea, juice, and soda.

These beverage preparation devices may be used in commercial and residential settings. For example, beverage preparation devices may be used in healthcare facilities, colleges, theaters, restaurants, offices, hotels, convenience stores, in the home, and elsewhere.

Beverage preparation devices may include many structural components to efficient operation, maintenance, and repair in all these settings. The demand for beverage preparation devices has helped open up a field of innovation in efficient operation, maintenance, and repair for these devices.

SUMMARY

The present disclosure may comprise one or more of the following features and combinations thereof.

In some embodiments, an example beverage device includes an on-board touch screen display and a plurality of components configured to operate the beverage device to prepare a beverage. The beverage device includes a computing device comprising instructions embodied in one or more non-transitory machine accessible storage media, the instructions executable by the computing device to cause the computing device to: store a virtual rendering of at least one of the plurality of device components; display, on the on-board touch screen display, the virtual rendering; receive a touch input related to at least one of the plurality of device components; and provide feedback from at least one of the plurality of device components to diagnose an error, wherein the error is a deviation from an operating norm of at least one of the plurality of device components. The computing device diagnoses the error without requiring disassembly of the beverage device. This can be a significant benefit and where it is difficult to disassemble the machine or impossible for a single person to move the machine for disassembly.

In some embodiments, a beverage device with improved diagnostic functionality includes an on-board touch screen display and a plurality of device components configured to operate the beverage device to dispense a beverage. The beverage device includes a computing device comprising instructions embodied in one or more non-transitory machine accessible storage media, the instructions executable by the computing device to cause the computing device to: store a virtual rendering of at least one of the plurality of device components; display, on the on-board touch screen display, the virtual rendering; receive a touch input related to at least one of the plurality of device components; and generate an output.

In some embodiments, a beverage device with improved diagnostic and repair functionality includes an on-board touch screen display and a plurality of device components configured to operate the beverage device to dispense a beverage and where at least one of the plurality of device components has pre-defined operating characteristics. The beverage device includes a computing device comprising instructions embodied in one or more non-transitory machine accessible storage media, the instructions executable by the computing device to cause the computing device to: store the pre-defined operating characteristics; store a virtual rendering of a plurality of device components; display, on the on-board touch screen display, the virtual rendering; receive a touch input corresponding to a diagnostic request; and in response to the touch input, operate at least one of the plurality of device components.

In some embodiments, a beverage device with improved diagnostic and repair functionality includes an on-board touch screen display and a plurality of device components configured to operate the beverage device to dispense a beverage, where at least one of the plurality of device components has pre-defined operating characteristics. The beverage device includes a computing device comprising instructions embodied in one or more non-transitory machine accessible storage media, the instructions executable by the computing device to cause the computing device to: store the pre-defined operating characteristics; monitor at least one of a plurality of device components to determine whether the at least one of the plurality of device components is operating outside of its pre-defined operating characteristics; generate an alert when the at least one of the plurality of device components is operating outside of its pre-defined operating characteristics; store a virtual rendering of the plurality of device components; receive a repair request touch input; and in response to the repair request touch input, generate a plurality of repair outputs comprising repair instructions for the at least one of the plurality of device components that is not operating within the pre-defined range.

These and other features of the present disclosure will become more apparent from the following description of the illustrative embodiments.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

FIG. 4 shows prior art service instructions from a prior art service manual;

FIG. 5 is an example schematic view, shown as viewed on an on-board display of a beverage preparation device, according to some embodiments.

DETAILED DESCRIPTION OF THE DRAWINGS

Figure 1:
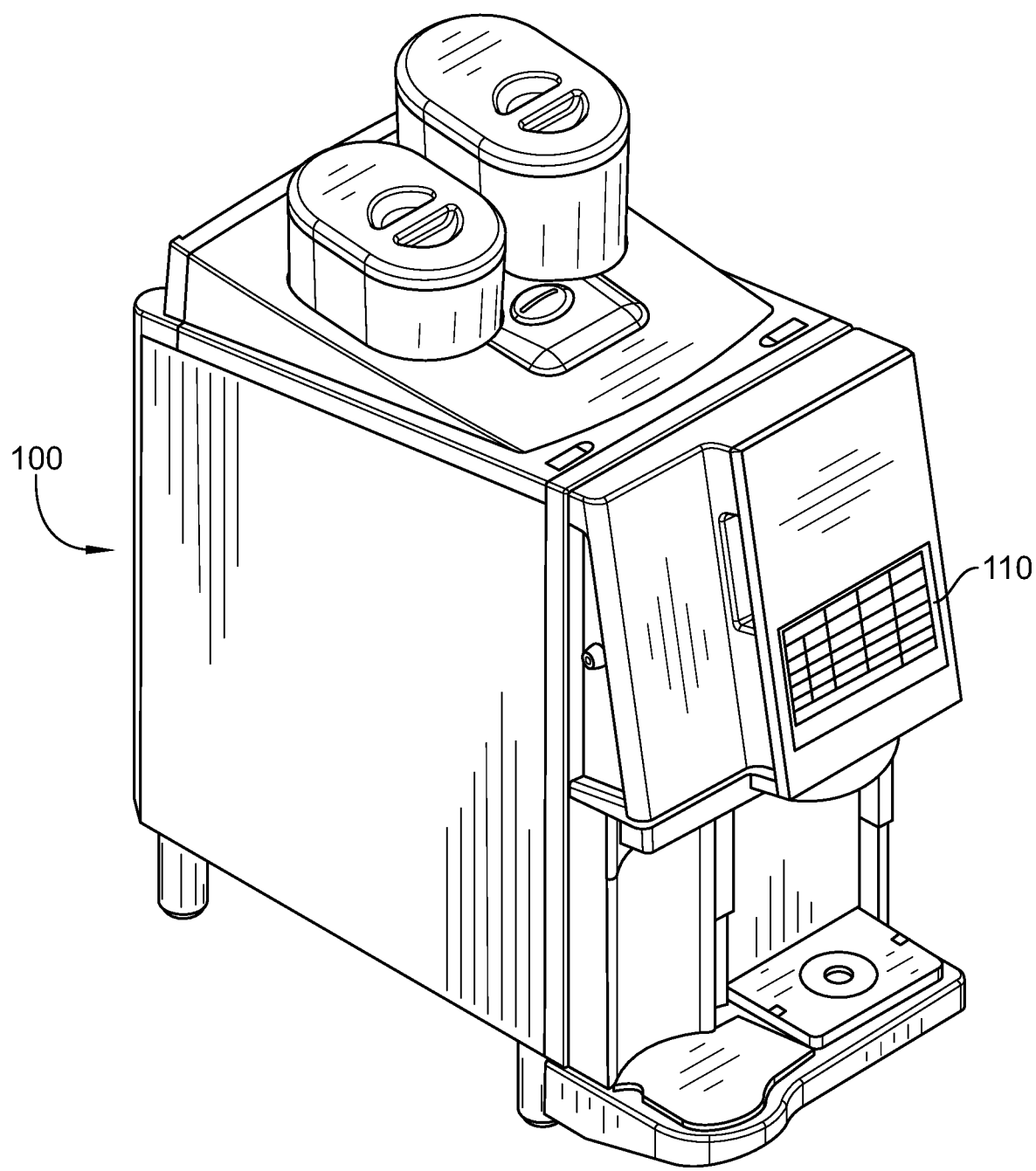
FIG. 1 illustrates a beverage preparation device with an on-board touch screen display, according to some embodiments.

For the purposes of promoting an understanding of the principles of the disclosure, reference will now be made to a number of illustrative embodiments illustrated in the drawings and specific language will be used to describe the same.

Figure 2:
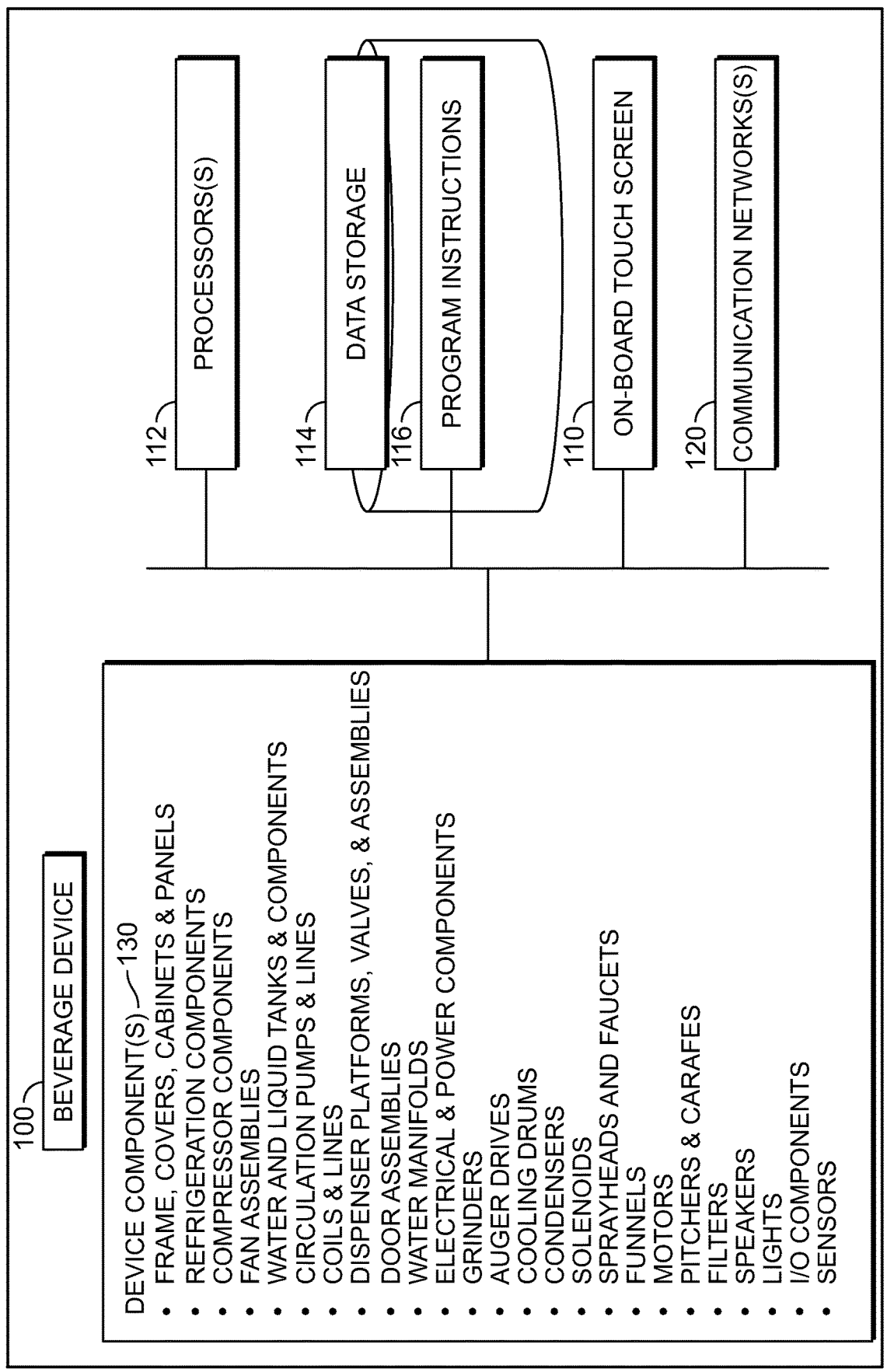
FIG. 2 is a block diagram showing components of a beverage preparation device, according to some embodiments.

FIG. 1 illustrates a beverage preparation device 100 with an on-board touch screen display 110, according to some embodiments. FIG. 2 is a block diagram showing various components of a beverage preparation device 100, according to some embodiments. Referring now to FIGS. 1 and 2, an embodiment and flow diagram of a beverage device 100 with an on-board touch screen display 110 is shown. The illustrative beverage device 100 depicted is an espresso machine, although this is not intended to be limiting in any way. The beverage device 100 may be any type of beverage device, including devices for making cold, hot, frozen, and frothed beverages such as coffee, espresso, milk, water, juice, tea, soda, granitas, smoothies, or any type of beverage.

The beverage device 100 may include hardware, firmware, and/or software components that are configured to perform the functions disclosed herein. While not specifically shown, the beverage device 100 may include other computing devices (e.g., servers, mobile computing devices, a network of computers, graphical processing units, processors, etc.) which may be in communication with each other and/or the beverage device 100 via one or more communication network(s) 120 to perform one or more of the disclosed functions.

The illustrative beverage device 100 may include at least one processor 112 (e.g., a controller, application specific integrated circuits, microprocessor, microcontroller, digital signal processor, graphical processing unit, etc.), memory 114, and may be configured to execute computer-readable programming instructions 116 that are stored in the data storage 114 and are executable to cause the beverage device 100 to perform the functions and features described herein.

The data storage 114 may include or take the form of one or more computer-readable storage media that can be read or accessed by processor(s) 112. The one or more computer-readable storage media can include volatile and/or non-volatile storage components, such as optical, magnetic, organic or other memory or disc storage, which can be integrated in whole or in part with processor(s) 112. In some embodiments, the data storage can be implemented using a single physical device (e.g., one optical, magnetic, organic or other memory or disc storage unit), while in other embodiments, the data storage can be implemented using two or more physical devices.

The beverage device 100 may communicate with other computing devices and/or systems via communication network(s) 120. The communication network(s) 120 may be embodied as, for example, a cellular network, a local area network, a wide area network (e.g., Wi-Fi), a personal cloud, a virtual personal network (e.g., VPN), an enterprise cloud, a public cloud, an Ethernet network, and/or a public network such as the Internet. The communication network(s) 120 may, alternatively or additionally, enable shorter-range wireless communications between the computing device 100 and other computing devices using, for example, BLUETOOTH, NFC, and/or mesh network technology. Accordingly, the communication network(s) 120 may include one or more optical, wired, and/or wireless network interface subsystems, cards, adapters, or other devices, as may be needed pursuant to the specifications and/or design of the particular beverage device 100.

As illustrated in FIG. 2 (as examples only and without limitation), the beverage device may include various device component(s) 130. For example, the beverage device 100 may include device components for input and output (i.e., I/O components) such as displays, microphones, keyboards, additional touchscreens, virtual keypads, biometric sensors, audio speakers, LEDs, and additional displays.

The beverage device 100 may also include device component(s) 130 such as frames, covers, cabinets, panels, refrigeration components, compressor components, fans and fan assemblies, water tanks and components, liquid tanks and components, circulation pumps and lines, coils and lines, dispenser platforms and assemblies, valves and assemblies, door assemblies, water manifolds, electrical and power components, grinders (such as coffee bean burr or conical grinders), auger drives, cooling drums, condensers, solenoids, sprayheads and faucets, funnels, motors, pitchers and carafes, and filters.

The beverage device 100 may optionally include one or more sensor(s) (shown in FIG. 2 as part of device component(s) 102) such as load sensors, position sensors, touch sensors, ultrasonic range sensors, infrared sensors, sonar, optical sensors, biosensors, force sensors, proximity sensors, Radio Frequency identification (RFID) sensors, Near Field Communication (NFC) sensors, wireless sensors, compasses, smoke sensors, light sensors, radio sensors, depth sensors, microphones, speakers, radar, cameras, and/or motion sensors, among others. The additional sensors may provide sensor data to the processor(s) 112 to allow for interaction of the beverage device 100 with the environment.

Figure 3:
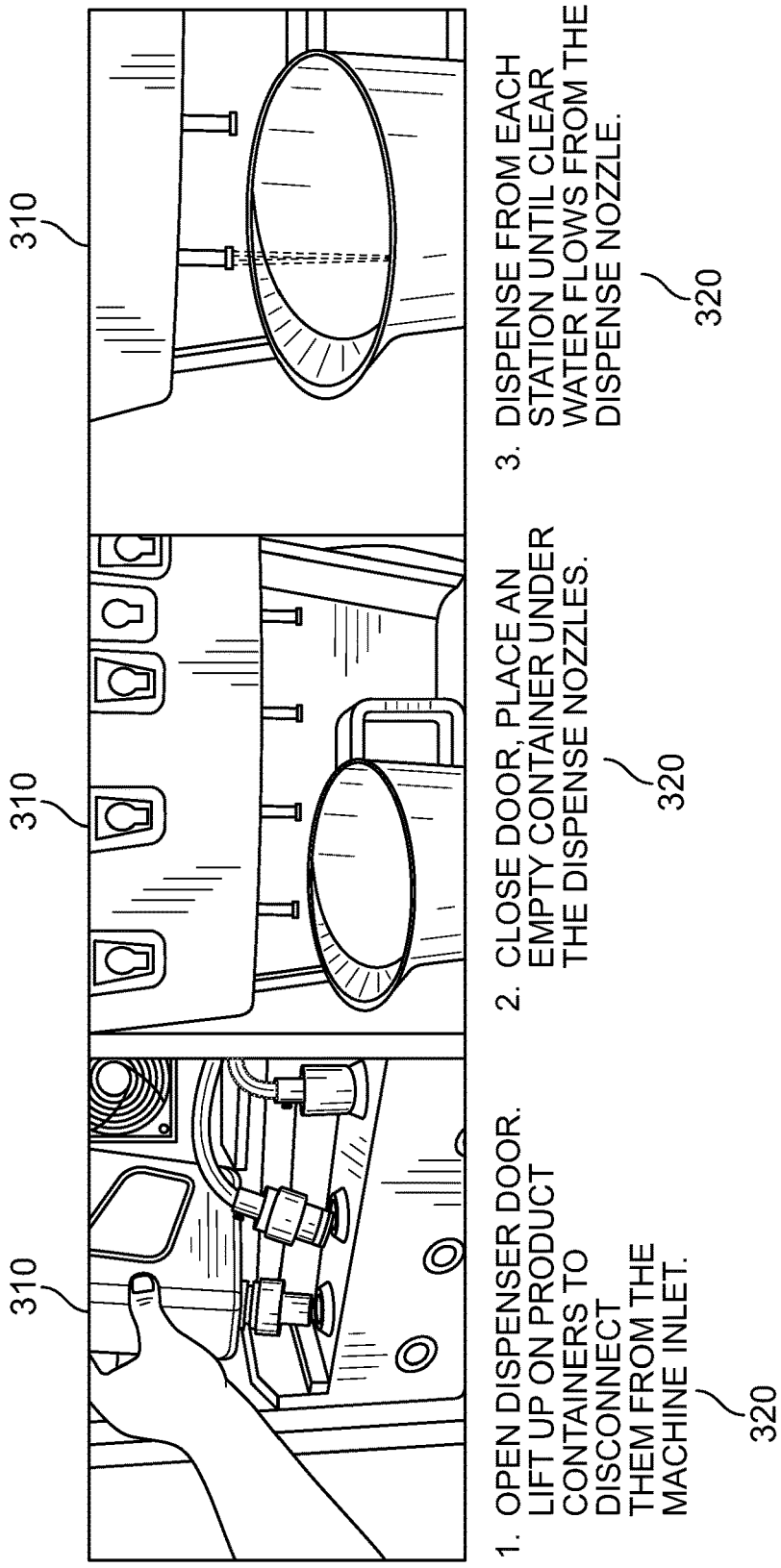
FIG. 3 shows prior art service instructions from a prior art service manual.

FIG. 3 shows prior art service instructions 300 from a prior art service manual. The service instructions 300 include photographed sections 310 and text sections 320. As shown in FIG. 3, no virtual renderings of components are displayed on an on-board display and no interaction is possible with the service instructions 300.

FIG. 4 shows prior art service instructions 400 from a prior art service manual. The service instructions 400 include a text section 410 and a schematic section 420. As shown in FIG. 3, no virtual renderings of components are displayed on an on-board display and no interaction is possible with the service instructions 400.

FIG. 5 is an example virtual schematic view 500, as displayed on an on-board touch-screen display of a beverage preparation device, according to some embodiments. The virtual schematic view 500 of FIG. 5 includes a banner 502 with a menu button 504 and banner options 506 (as illustrated in FIG. 5 by way of example only, banner options include Technician, Bath Fill, Ratio, and Service (I/O)), device components 510, outputs 520, zoom buttons 530, navigation buttons 540, an operational button 550 (depicted in FIG. 5 as a disable button), and a computing device 560 (e.g., processor(s) 112). The device components 510 may be the same or similar to device components 130 as illustrated in described in reference to FIGS. 1 and 2.

Figure 6:
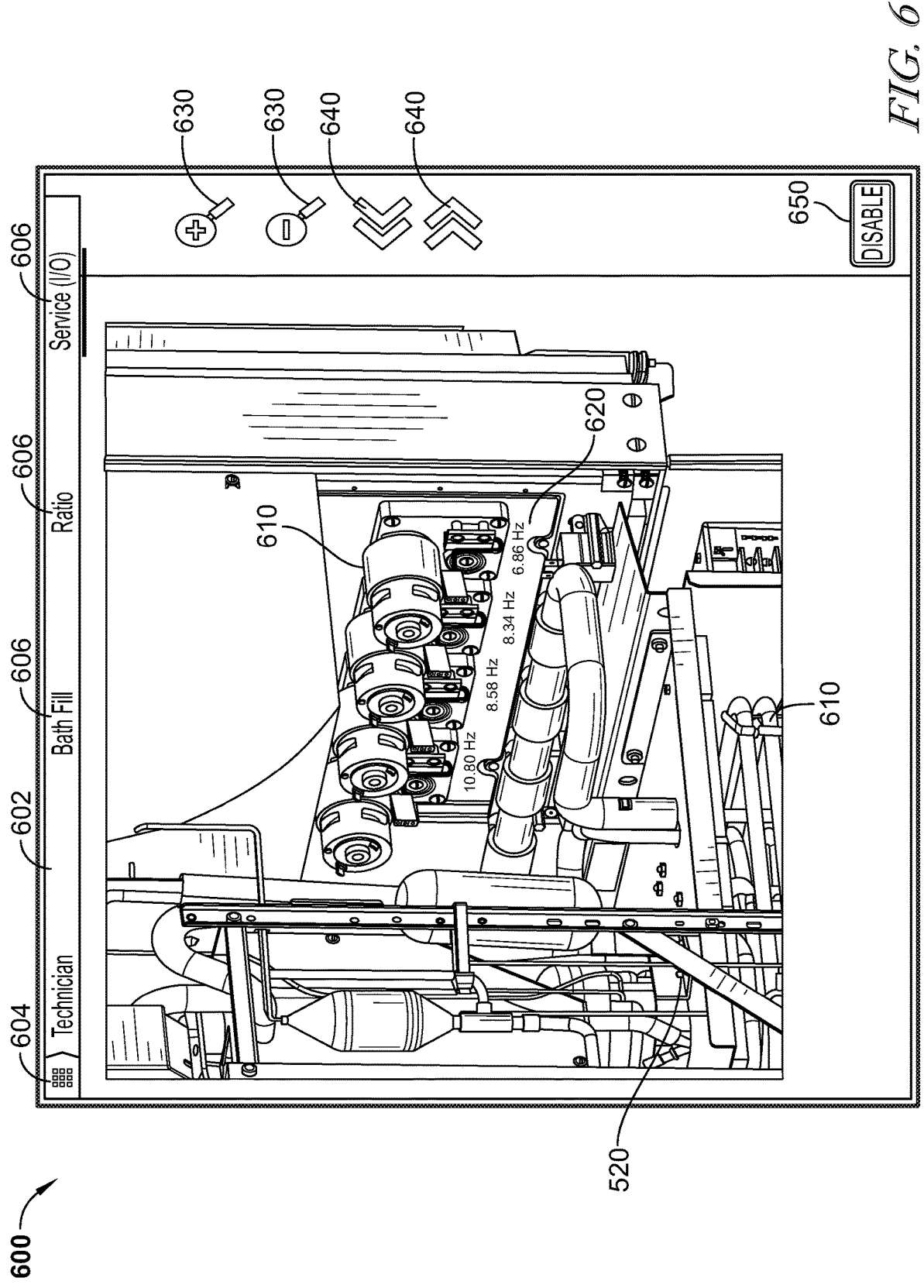
FIG. 6 is an example virtual rendering of components of a beverage preparation device with portions of the casing cut away, according to some embodiments.

FIG. 6 is an example virtual rendering 600 of device components 610 of a beverage preparation device with portions of the casing cut away, according to some embodiments. Similar to the components and reference numerals shown in FIG. 5, the virtual rendering 600 FIG. 6 includes a banner 602 with a menu button 604 and banner options 606 (as illustrated in FIG. 6 by way of example only, banner options include Technician, Bath Fill, Ratio, and Service (I/O)), device components 610, outputs 620, zoom buttons 630, navigation buttons 640, and an operational button 650. For purposes of clarity, FIGS. 5 and 6 do not always point out each instance of every element (e.g., only a few reference numerals are used to designate device components 510, outputs 520, device components 610 and device components 620, despite more of these elements clearly existing in each figure), and this is not intended to be limiting in any way but only for purposes of visual clarity and brevity.

In operation according to some embodiments, the schematic view 500 and/or the virtual rendering 600 may be used to assist with diagnostics, repair, and replacement. For example, the schematic view 500 and/or the virtual rendering 600 may be used to identify device components (e.g., device components 510 or device components 610) that are malfunctioning, operating outside of operating ranges or norms (e.g., each component may have a set of operating characteristics used to help determine whether it is operating properly), or that may need replacement soon (e.g., via predictive diagnostics). Alternatively or additionally, the schematic view 500 and/or the virtual rendering 600 may be used to navigate through a set of diagnostic, repair, or replacement instructions. As an improvement to the old print instructions for diagnostic, repair, or replacement of beverage devices, the schematic view 500 and the virtual rendering 600 may be interactive and provide technical utility in multiple ways.

In some embodiments, the schematic view 500 and the virtual rendering 600 may include functionality for movement, zoom, animations, color outputs, or otherwise provide interactivity to a technician servicing the beverage device. Some of these functions may be accomplished via touch inputs, such as movement via dragging a finger on the on-board touch screen display or zoom via pinch on the on-board touch screen display (or the zoom buttons 530 and zoom buttons 630).

In some embodiments, the processor of the beverage device may store pre-defined operating characteristics (e.g., frequency ranges, temperature ranges, pressure ranges, fill volumes, quantity ranges, etc.), or operating norms, for one or more of the device components. Using sensors or other feedback devices, the beverage device may monitor one or more of the device components to determine whether it is operating within or close to the edges of those pre-defined operating characteristics. If the device is not operating within those characteristics, or the device is close to not operating within those characteristics, the beverage device may generate an alert or an output.

In some embodiments, diagnostics (or replacement or repair) requests and operations may occur without requiring any disassembly of the beverage device. For example, a touch input may be received on the on-board touch screen of a beverage device that corresponds to a diagnostics request. Depending on the touch input received (e.g., a systems diagnostic button versus touching an individual component for diagnostics), the beverage device may run diagnostics on one or more components. The beverage device may then generate an output (e.g., output 510 and output 610) to indicate the results of the diagnostic or an alert (e.g., an audible alert or a flashing signal on the screen) to indicate further attention is needed. The outputs and alerts may be generated on the beverage device (e.g., via a speaker or the on-board touch screen display) or may be sent to another computing device (e.g., a mobile phone via BLUETOOTH or NFC, another laptop or tablet via Wi-Fi, LAN, or mesh network, or a network of computers).

In some embodiments, the beverage device may request one or more additional inputs (e.g., touch inputs) based on the results of the initial diagnostics. For example, the initial touch input may correspond to a request to determine whether an individual component (e.g., an encoder) is operating properly. To determine this, the beverage device may activate that individual component and display a dialog box or other type of graphical user interface or display report on the on-board touch screen display asking for one or more additional touch inputs (e.g., the beverage device may display a dialog box asking for a second touch input showing whether the activation of the component turned a dispenser on or had some other observable action).

In some embodiments, further service, repair, and replacement functionality is achieved via the schematic view 500 and/or the virtual rendering 600. For example, rather than relying on a printed service manual for the beverage device, the schematic view and the virtual rendering view may be used to interactively direct a technician or user through a set of repair or replacement instructions for one or more components.

The feedback provided by an operator as a result of being directed by the system can be used to generate a schedule of parts and/or steps required to repair the machine. This could be useful since an operator who is not a technician can be guided through various diagnostic steps on site. Such a non-technical operator can then take care of on-site diagnosis and the system can send a report to a more technical person. The more technical person can then assess what needs to be done and direct the non-technical person to carry out the necessary steps, if appropriate. Alternatively, the technical person can use the information to generate a schedule or report of items that are needed to repair the equipment.

The system could provide significant time savings for each repair because the diagnosis helps the repairperson to anticipate and bring anticipated needed repair parts. This may allow the technician to quickly and more efficiently repair the equipment by assuring that the necessary parts will need to be brought to the job site. One of the problems with prior art systems is that they cannot generate reports to help a technician. In this regard, prior art systems may have caused a technician to do the diagnosis one day only to have to return to the site on a subsequent day with the parts that he did not bring with him to the job site.

This reporting system can also be useful for parts that are not available or require a longer lead-time to obtain. This allows the operator to anticipate equipment outage if the necessary parts are not available. This also helps the technician schedule in a return visit when he has acquired all the necessary parts. This schedulability or predictability of this system helps to improve the efficiency associated with the repair operations. Repair operations include not only the mechanical activities and components required for the repair but also the travel time to and from the repair, the troubleshooting time on the scene, as well as installation of the necessary components.

The present system also helps assure that the most accurate and up-to-date diagnostic system is being provided on site. Since the system is in communication with a more central system, updates and modifications to the repair protocols and diagnostic protocols can be quickly and efficiently downloaded assuring that the system is its most up-to-date condition. The second greatly help with the efficiency of the repair since the technician has the most up-to-date information and a real-time basis.

For example, the beverage device may receive a touch input via the on-board touch screen corresponding to a repair request. In response, the beverage device may execute one or more sets of visual or audio outputs showing how to efficiently disassemble the beverage device to repair or replace one or more device components. Those visual and audio outputs may include videos, animations, rotatable, movable, and zoomable virtual renderings, or other functionality to increase the ease, and efficiency of repair or replacement of the part.

In some embodiments, one or more of the visual or audio outputs may be displayed on the beverage device, a mobile computing device (e.g., a smartphone), a tablet, a laptop, a network of computers, other computing devices, or a combination of any of these.

Although various embodiments of the present invention have been described with reference to a particular arrangement of parts, features and the like, these are not intended to exhaust all possible arrangements or features. Many other embodiments, modifications and variations will be ascertainable to those of skill in the art. Because many modifications and variations are possible in light of the above teachings, it is to be understood that within the scope of the appended claims, the invention may be practiced otherwise than as specifically described.

What is claimed is:

1. A beverage device comprising:
   an on-board touch screen display;
   a plurality of device components configured to operate the beverage device to prepare a beverage;
   a computing device comprising instructions embodied in one or more non-transitory machine accessible storage media, the instructions executable by the computing device to cause the computing device to:
   store a virtual rendering of at least one of the plurality of device components;
   display, on the on-board touch screen display, the virtual rendering;
   receive, from the on-board touch screen display, a first touch input related to at least one of the plurality of device components configured to dispense a beverage through a dispenser;
   in response to the first touch input, activate the at least one of the plurality of device components to dispense a beverage through the dispenser and display a dialog box asking for a second touch input showing whether the activation of the at least one of the plurality of device components causes the beverage to be dispensed through the dispenser, wherein the at least one of the plurality of device components activated in response to the first touch input to dispense the beverage is not visible for inspection without disassembly of the beverage device, but determining whether the beverage was dispensed through the dispenser in response to the first touch input is observable by a non-technical operator;
   receive, from the on-board touch screen display, the second touch input indicating whether the activation of the at least one of the plurality of device components caused the beverage to be dispensed through the dispenser as indicated by the dialog box; and
   provide feedback from at least one of the plurality of device components to diagnose an error, wherein the error is a deviation from an operating norm of at least one of the plurality of device components;
   generate a schedule of parts to repair at least one of the plurality of device components, including one or more device components not visible for inspection, to address the error; and
   wherein the computing device diagnoses the error without requiring disassembly of the beverage device.

2. A beverage device with improved diagnostic functionality comprising:
   an on-board touch screen display;
   a plurality of device components configured to operate the beverage device to dispense a beverage;
   a computing device comprising instructions embodied in one or more non-transitory machine accessible storage media, the instructions executable by the computing device to cause the computing device to:
   store a virtual rendering of at least one of the plurality of device components;
   display, on the on-board touch screen display, the virtual rendering;
   receive, from the on-board touch screen display, a first touch input by a non-technical operator related to at least one of the plurality of device components, wherein the at least one of the plurality of device components is not visible for inspection without disassembly of the beverage device;
   in response to the first touch input, generate an output, the output comprising:
   activating the at least one of the plurality of device components to produce a resultant action that is observable by a non-technical operator and displaying a dialog box asking for a second touch input by the non-technical operator showing whether the activation of the at least one of the plurality of device components causes some observable actions that would be observable by the non-technical operator;
   receive the second touch input by the non-technical operator indicating whether activation of the at least one of the plurality of device components caused one or more observable actions as indicated by the dialog box; and
   generate a schedule of parts required to repair at least one of the plurality of device components, including one or more device components not visible for inspection, based on the one or more observable actions by the non-technical operator identified by the second touch input without requiring disassembly of the beverage device.

3. The beverage device of claim 2, wherein the output comprises an audio output.

4. The beverage device of claim 3, wherein the output comprises a visual output displayed on the on-board touch screen display.

5. The beverage device of claim 4, wherein the output comprising an interactive diagnostic user interface comprising:
   a plurality of visual or audio outputs corresponding to the at least one of the plurality of device components, wherein the plurality of visual or audio outputs comprise diagnostic or service information.

6. The beverage device of claim 2, wherein the output is sent, via a communication network, from the beverage device to a second device.

7. The beverage device of claim 2, wherein the output comprises:
displaying, on the on-board touch screen, a first instruction related to a diagnostic process; and
the instructions are further configured to cause the computing device to receive, from the on-board touch screen, the second touch input related to the diagnostic process.

8. The beverage device of claim 2, wherein the resultant action that is observable by the non-technical operator comprises turning on a dispenser to dispense a beverage.

9. A beverage device with improved diagnostic and repair functionality comprising:
an on-board touch screen display;
a plurality of device components configured to operate the beverage device to dispense a beverage, wherein at least one of the plurality of device components has pre-defined operating characteristics;
a computing device comprising instructions embodied in one or more non-transitory machine accessible storage media, the instructions executable by the computing device to cause the computing device to:
store the pre-defined operating characteristics;
store a virtual rendering of a plurality of device components;
display, on the on-board touch screen display, the virtual rendering;
receive a first touch input by a non-technical operator corresponding to a diagnostic request; and
in response to the first touch input, activate the at least one of the plurality of device components to produce a resultant action that is observable by the non-technical operator and display a dialog box asking for a second touch input showing whether the activation of the at least one of the plurality of device components causes some observable actions, wherein the at least one of the plurality of device components is not visible for inspection without disassembly of the beverage device;
receive the second touch input by the non-technical operator indicating whether activation of the at least one of the plurality of device components caused one or more observable actions as indicated by the dialog box; and
generate a schedule of parts required to repair at least one of the plurality of device components, including one or more device components not visible for inspection, based on the one or more observable actions identified by the second touch input without requiring disassembly of the beverage device.

10. The beverage device of claim 9, wherein the instructions are further configured to cause the computing device to generate an output indicating whether the at least one of the plurality of device components is operating within a pre-defined range.

11. The beverage device of claim 9, wherein the output comprises a visual output displayed on the on-board touch screen display.

12. The beverage device of claim 9, wherein the output comprises an audio output.

13. The beverage device of claim 9, wherein the output is sent, via a communication network, from the beverage device to a second device.

14. The beverage device of claim 10, wherein, when at least one of the plurality of device components is not operating within its pre-defined operating characteristics, the instructions are further configured to cause the computing device to:
generate a plurality of repair outputs comprising repair or replacement instructions for the at least one of the plurality of device components that is not operating within the pre-defined range.

15. The beverage device of claim 14, wherein at least one of the plurality of repair outputs is interactively displayed on the on-board touch screen display such that the virtual rendering is movable via touch input.

16. The beverage device of claim 14, wherein at least one of the plurality of repair outputs is interactively displayed on the on-board touch screen display such that the virtual rendering is zoomable via touch input.

17. A beverage device with improved diagnostic and repair functionality comprising:
an on-board touch screen display;
a plurality of device components configured to operate the beverage device to dispense a beverage, wherein at least one of the plurality of device components has pre-defined operating characteristics;
a computing device comprising instructions embodied in one or more non-transitory machine accessible storage media, the instructions executable by the computing device to cause the computing device to:
store the pre-defined operating characteristics;
monitor at least one of a plurality of device components to determine whether the at least one of the plurality of device components is operating outside of its pre-defined operating characteristics, comprising:
storing a virtual rendering of at least one of the plurality of device components;
displaying, on the on-board touch screen display, the virtual rendering;
receiving, from the on-board touch screen display, a first touch input by a non-technical operator related to at least one of the plurality of device components, wherein at least one of the plurality of device components is not visible for inspection without disassembly of the beverage device;
in response to the first touch input, activating the at least one of the plurality of device components to produce a resultant action that is observable by the non-technical operator and displaying a dialog box asking for a second touch input by the non-technical operator showing whether the activation of the at least one of the plurality of device components causes some observable actions; and
receiving, from the on-board touch screen display, the second touch input indicating whether the activation of the at least one of the plurality of device components caused one or more observable actions as indicated by the dialog box;
generate an alert when the at least one of the plurality of device components is operating outside of its pre-defined operating characteristics;
generate a schedule of parts required to repair at least one of the plurality of device components, including one or more device components not visible for inspection, based on the one or more observable actions identified by the second touch input without requiring disassembly of the beverage device;

store a virtual rendering of the plurality of device components;

receive a repair request touch input; and in response to the repair request touch input, generate a plurality of repair outputs comprising repair instructions for the at least one of the plurality of device components that is not operating within the pre-defined range.

18. The beverage device of claim 17, wherein at least one of the plurality of repair outputs comprises displaying, on the on-board touch screen display, a virtual rendering of at least one of the plurality of device components.

19. The beverage device of claim 17, wherein the plurality of repair outputs are accessible without requiring disassembly of the beverage device.

20. The beverage device of claim 17, wherein at least one of the plurality of repair outputs comprises an animation displayed on the on-board touch screen display.

* * * * *